United States Patent [19]
Oh et al.

[11] Patent Number: 6,111,615
[45] Date of Patent: Aug. 29, 2000

[54] ADDRESS GENERATING AND MAPPING DEVICE OF VIDEO CAPTURE SYSTEM

[75] Inventors: Hyun-Kyung Oh; Kyeung-Hak Seo, both of Seoul, Rep. of Korea

[73] Assignee: SamSung Electronics Co., Ltd., Suwon, Rep. of Korea

[21] Appl. No.: 08/777,128

[22] Filed: Dec. 30, 1996

[30] Foreign Application Priority Data

Dec. 29, 1995 [KR] Rep. of Korea ................ 95-66825

[51] Int. Cl.$^7$ .......................................... H04N 9/64
[52] U.S. Cl. .................... 348/714; 340/798; 364/521; 364/518; 364/519; 345/503; 345/507; 345/509
[58] Field of Search .................... 348/714, 716, 348/718, 719; 364/520, 200; 356/5

[56] References Cited

U.S. PATENT DOCUMENTS

| | | | |
|---|---|---|---|
| 4,654,804 | 3/1987 | Thaden et al. | 364/520 |
| 4,903,197 | 2/1990 | Wallace et al. | 364/200 |
| 5,226,136 | 7/1993 | Nakagawa | 395/425 |
| 5,276,519 | 1/1994 | Richards et al. | 358/209 |
| 5,291,262 | 3/1994 | Dunne | 356/5 |
| 5,774,132 | 6/1998 | Uchiyama | 345/503 |

*Primary Examiner*—Chris S. Kelley
*Assistant Examiner*—Shawn S. An
*Attorney, Agent, or Firm*—Robert E. Bushnell, Esq.

[57] ABSTRACT

An address generating and mapping device of a video capture system includes: a microprocessor having a counter counted by being synchronized with a horizontal synchronizing signal of a video signal, an address port for outputting an address to be used when reading from a memory, and a counter port for outputting the counter value and a bank selection signal by using predetermined higher bits among the counter output as the bank selection signal for selecting data banks of the memory; a counter for performing a predetermined operation according to a signal for selecting a mode, when a mode for generating an address necessary for storing the video signal is referred to as an address generating mode and a mode for mapping an address necessary for accessing the memory is referred to as an address mapping mode; multiplexers for outputting a counter value from the microprocessor to higher addresses of the memory when the mode selection signal is the address generating mode and outputting the addresses output from the microprocessor as higher addresses of the memory when the mode selection signal is the address mapping mode, and a bank selecting unit for outputting higher bits among the signals output from the counter built in the microprocessor as a signal for selecting the data banks of the memory when the mode selection signal is the address mapping mode. In the address generating mode, the counter counts the number corresponding to that of pixels constituting a horizontal line of the video signal to output as lower addresses of the memory and is cleared by a clear signal having the same frequency as that of the horizontal synchronizing signal of the video signal, and, in the address mapping mode, the counter connects address lines output from the microprocessor to lower address lines of the memory. The use of the mode selection signal can provide a simple address generating and mapping circuit for the video capture system.

9 Claims, 1 Drawing Sheet

ADDRESS GENERATING AND MAPPING DEVICE OF VIDEO CAPTURE SYSTEM

CLAIM OF PRIORITY

This application makes claims all benefits accruing under 35 U.S.C. §119 from an application for ADDRESS GENERATING AND MAPPING DEVICE OF VIDEO CAPTURE SYSTEM earlier filed in the Korean Industrial Property Office on Dec. 29, 1995 and there duly assigned Ser. No. 66825/1995.

BACKGROUND OF THE INVENTION

The present invention relates to a video capture system, and more particularly, to an address generating and mapping device of a video capture system wherein addresses are generated and the addresses between a microprocessor and a memory are mapped when capturing a video signal and storing it in the memory.

In a typical capture system, a picture of a video signal output on a screen by an NTSC (National Television System Committee) or PAL (Phase Alternation by Line) method is captured and stored in a memory, and then a CPU (or microprocessor) properly changes the data stored in the memory and outputs the changed data to a printer.

In order to capture an NTSC (or PAL) signal, a synchronizing signal is separated from a composite video signal, a chrominance signal is removed, the synchronizing signal is converted into a digital signal by an analog-to-digital (A/D) converter, and then the digital signal is stored in the memory.

A counter circuit for generating memory addresses where the digital data is to be stored is required to store the digital signal in the memory. The captured video data is converted by an appropriate algorithm and output in various forms. Also, an address mapping circuit for mapping addresses between the memory and the CPU is required to make the CPU recognize the generated memory addresses.

SUMMARY OF THE INVENTION

It is an object of the present invention to provide an address generating and mapping device for generating memory addresses required to store a captured video signal in a memory and providing a CPU with addresses required for accessing the memory.

To accomplish the above object, there is provided an address generating and mapping device of a video capture system for capturing a video signal and storing the video signal in a memory comprised of predetermined data banks and reading data in the memory, comprising: a microprocessor having a counter counted by being synchronized with a horizontal synchronizing signal of the video signal, an address port for outputting an address to be used when reading the memory, and a counter port for outputting the counter value and a bank selection signal by using predetermined higher bits among the counter output as the bank selection signal for selecting the data banks of the memory; a counter for performing a predetermined operation according to a signal for selecting a mode, when a mode for generating an address necessary for storing the video signal is referred to as an address generating mode and a mode for mapping an address necessary for accessing the memory is referred to as an address mapping mode; multiplexers for outputting a counter value from the microprocessor to higher addresses of the memory when the mode selection signal is the address generating mode and outputting the addresses output from the microprocessor as higher addresses of the memory when the mode selection signal is the address mapping mode; and a bank selecting unit for outputting higher bits among the signals output from the counter built in the microprocessor as a signal for selecting the data banks of the memory when the mode selection signal is the address mapping mode, wherein, in the address generating mode, the counter counts the number corresponding to that of pixels constituting a horizontal line of the video signal to output as lower addresses of the memory and is cleared by a clear signal having the same frequency as that of the horizontal synchronizing signal of the video signal, and, in the address mapping mode, the counter connects address lines output from the microprocessor to lower address lines of the memory.

The counter built in the microprocessor is an 8 bit counter, and produces an interrupt whenever a horizontal synchronizing signal of the video signal is supplied and counts up to 256 horizontal lines, the address port in the microprocessor includes two ports P0 and P2 and outputs addresses A[15 . . . 0] via the ports P0 and P2, the counter port produces and outputs addresses VA[16 . . . 9] output from the 8 bit counter and signals VA[16 . . . 14] for selecting data banks of the memory, and the counter counts 512 pixels and outputs the counted value as lower 9 bit addresses VDA[8 . . . 0] of the memory in the address generating mode, and outputs lower 9 bit addresses A[8 . . . 0] among the addresses A[15 . . . 0] from the microprocessor as lower 9 bit addresses VDA[8 . . . 0] of the memory in the address mapping mode.

The multiplexers output lower 4 bit addresses VA[12 . . . 9] output from the 8 bit counter built in the microprocessor as addresses VDA[12 . . . 9] of the memory in the address generating mode, and output 4 bit addresses A[12 . . . 9] from the microprocessor as the addresses VDA[12 . . . 9] of the memory in the address mapping mode.

The bank selecting unit outputs addresses VA[16 . . . 13] output from the counter built in the microprocessor as addresses VDA[16 . . . 13] of the memory in the address generating mode, and outputs data bank selection signals VA[16 . . . 14] from the microprocessor and an address A[13] as the addresses VDA[16 . . . 13] of the memory in the address mapping mode.

It is preferable that the memory includes 8 data banks having a 16 KB capacity.

According to the present invention, the use of a mode selection signal can provide simple address generating and mapping circuits required for recording a captured video in a video capture system in the memory.

BRIEF DESCRIPTION OF THE DRAWING

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
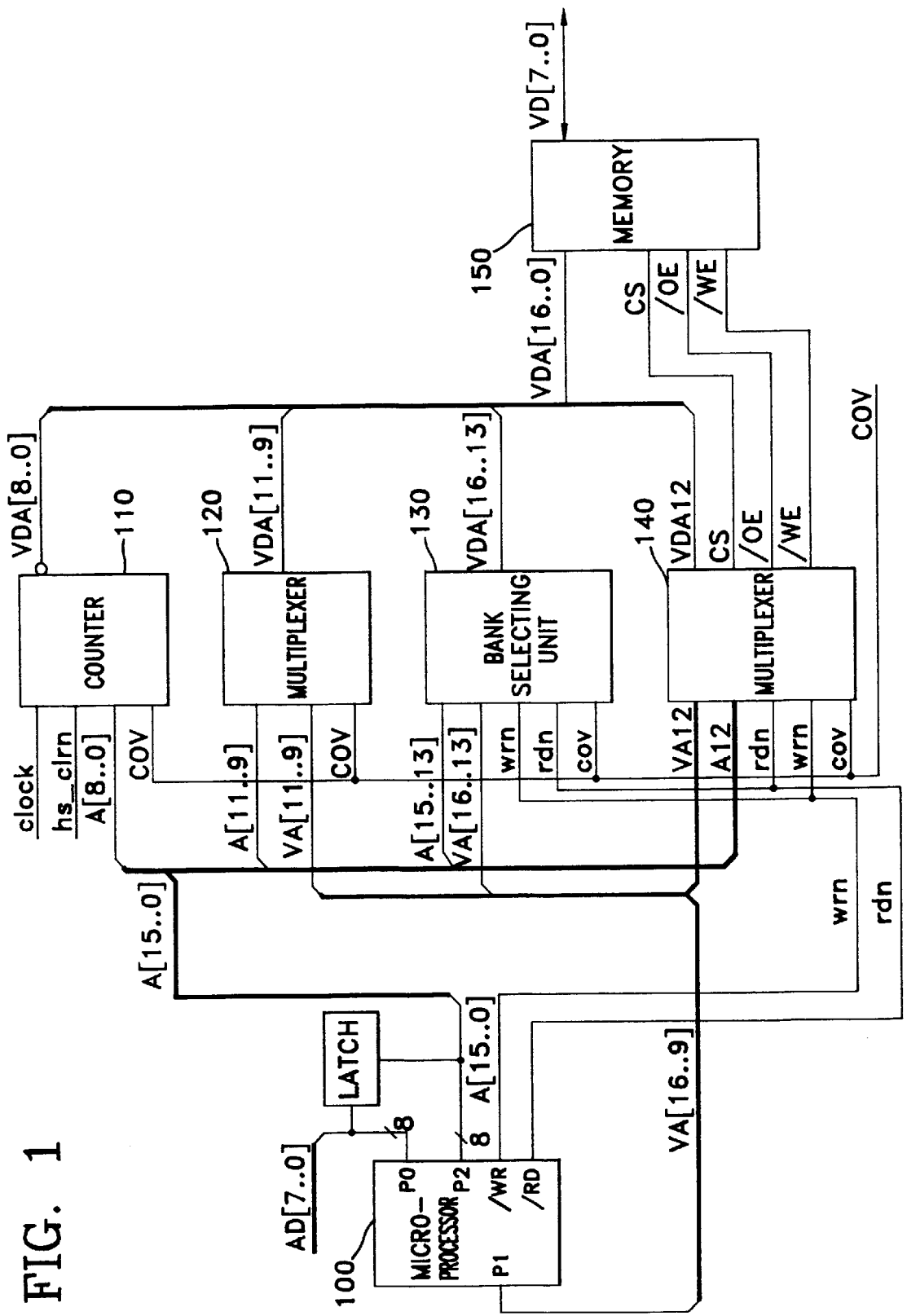
FIG. 1 is a block diagram showing an address generating and mapping device in a video capture system for capturing a video signal and storing the captured video signal in a memory according to an embodiment of the present invention.

Referring to FIG. 1, a microprocessor 100 has a built-in 8 bit counter. The 8 bit counter produces an interrupt whenever a horizontal synchronizing signal of a video signal is supplied and counts up to 256 horizontal lines. Also, the microprocessor 100 is provided with three ports P0, P1, and P2, each of which has an 8 bit address or data line. The microprocessor generates and outputs 8 addresses A[15 . . . 0] via the ports P0 and P2 among the three ports and the output of the 8 bit counter and signals VA[16 . . . 14] for selecting a data bank of a memory via the remaining port P1 among the three ports.

A counter 110 receives a clock signal equivalent to that used in the 8 bit counter connected within the microprocessor 100, and is cleared by a clear signal (hs_clm) having the same period as that of a horizontal frequency. Also, the counter 110 inputs a mode selection signal (cov) for selecting an address generating mode or an address mapping mode. In the address generating mode, the counter 110 counts 512 pixels and outputs to lower 9 bit addresses VDA[8 . . . 0] of a memory 150. In the address mapping mode, the counter 110 outputs lower 9 bit addresses A[8 . . . 0] among the addresses A[15 . . . 0] output from the microprocessor 100 as lower 9 bit addresses VDA[8 . . . 0] of the memory 150.

Also, multiplexers 120 and 140 input lower 4 bit addresses VA[12 . . . 9] among the 8 bit addresses VA[16 . . . 9] output from the 8 bit counter built in the microprocessor 100 and 4 bit addresses A[12 . . . 9] among the addresses A[15 . . . 0] output from the microprocessor 100. Also, the multiplexers 120 and 140 input the mode selection signal (cov) for selecting the address generating mode or address mapping mode. In the address generating mode, the multiplexers 120 and 140 output the addresses VA[12 . . . 9] as addresses VDA[12 . . . 9] of the memory 150. In the address mapping mode, the multiplexers 120 and 140 output the addresses A[12 . . . 9] as addresses VDA[12 . . . 9] of the memory 150.

A bank selecting unit 130 inputs addresses VA[16 . . . 13] among the 8 bit addresses VA[16 . . . 9] output from the counter built in the microprocessor 100, addresses A[15 . . . 13] output from the microprocessor 100 and the mode selection signal (cov) for selecting the address generating mode or address mapping mode. Also, if the mode selection signal (cov) represents the address generating mode, the bank selecting unit 130 outputs addresses VA[16 . . . 13] among the 8 bit addresses VA[16 . . . 9] output from the 8 bit counter built in the microprocessor 100 as the addresses VDA[16 . . . 13] of the memory 150. If the mode selection signal (cov) represents the address mapping mode, the bank selecting unit 130 outputs the data bank selection signals VA[16 . . . 14] and address A[ 13] from the microprocessor 100 as the addresses VDA[16 . . . 13] of the memory 150.

The memory 150 inputs the signals output from the counter 110, multiplexers 120 and 140 and bank selecting unit 130, and includes 8 data banks each having a 16 KB capacity, wherein any of the 8 banks is selected by the addresses VA[16 . . . 14] from the microprocessor 100.

An operation of the embodiment will be described as follows. An input video signal is input to an input terminal of an analog to digital (A/D) converter (not shown) and then converted into a digital signal. The converted digital signal is recorded in the memory 150 to capture a video data. At this time, addresses of the memory 150 must be produced to record the video data in the memory 150. Generally, the addresses are generated by operating the counter.

Since the present invention uses an SRAM of 128 KB capacity, for example, as a memory for recording the digital signal, a 17 bit counter must be used. The upper 8 bits are counted by the counter built in the microprocessor 100 instead of using an additional counter. The remaining lower 9 bits are counted by a special counter.

The counter, for determining the upper 8 bits, built in the microprocessor 100 generates an interrupt whenever receiving a horizontal synchronizing (H-sync) signal to count up one by one, whereby the counter counts up to 256 (i.e., $2^8$) horizontal lines. The counter 110 determining the lower 9 bits counts up to 512 (i.e., $2^9$) pixels. The clear signal (hs_clrn) input to the counter 110 has the same period as that of a horizontal frequency. However, it has reduced pulses in pulse width. Thus, when the clear signal (hs_clm) is input, that is, a data corresponding to a line is input, the counter 110 is cleared.

The addresses are generated when the input video signal is converted into a digital signal. At this time, the mode selection signal (cov) becomes high. If the mode selection signal becomes high, the counter 110 operates to produce the lower 9 bit addresses VDA[8 . . . 0] of the memory 150. The upper 8 bit addresses VDA[16 . . . 9] are set by mapping the addresses VA[16 . . . 9] output from the port P1 of the microprocessor 100. The multiplexer 120 allots the VA[11 . . . 9] as the VDA[11 . . . 9], and the multiplexer 140 allots the VA12 as the VDA12. Also, the multiplexer 140 outputs CE, /OE and /WE signals of the memory 150 using rdn, wrn and cov signals.

Meanwhile, after the generation of the addresses is completed, an address mapping between the memory 150 and the microprocessor 100 must be performed. In order to perform an address mapping between the 128 KB memory 150 and the microprocessor 100 capable of assigning addresses of a 64 KB memory, the upper 3 bits VA[16 . . . 14] are used for selecting a page (ank) in the memory 150 and the remaining bits VA[13 . . . 0] are used for indicating addresses within each 16 KB page (bank). If the A/D converter finishes the conversion of the input video signal into the digital signal, that is, if the mode selection signal becomes low, the memory addresses VDA[16 . . . 0] are mapped to the addresses A[15 . . . 0] of the microprocessor 100. At this time, the VDA[13 . . . 0] are mapped to the A[13 . . . 0]. However, the VDA[16 . . . 14] perform a page (bank) selecting function, wherein each bank is selected by a software which allots the addresses of the each bank to the port P1(VA[16 ..9]). If the mode selection signal becomes low, the counter 110 maps VDA[8..0] to A[8..0]. The multiplexer 120 maps VDA[11 . . . 9] to A[11 . . . 9], and the multiplexer 140 maps VDA12 to A12. The bank selecting unit 130 maps VDA13 to A13. When A14 equals to 1 and the reading signal (rdn) and writing signal (wrn) are disabled, the bank selecting unit 130 outputs VA[16 . . . 14] as VDA[16.. 14], thereby performing a selecting function. On the other hand, when the rdn or wrn signal is enabled, the microprocessor 100 operates the bank selecting unit 130 to select a last bank 7 (i.e., VDA[16 .. 14]=111), thereby using the last page (bank) in the memory 150.

The data stored in the memory 150 are changed in its size and concentration by software and output to a printer.

As described above, according to the present invention, the use of the mode selection signal provides a simple address generating and mapping circuit necessary for capturing a video in a video capture system and then recording the video in a memory.

What is claimed is:

1. An address generating and mapping device of a video capture system for capturing a video signal and storing said video signal in a memory comprised of predetermined data banks and reading data in said memory the device comprising:

a microprocessor having a counter counted by being synchronized with a horizontal synchronizing signal of the video signal, an address port for outputting an address to be used when reading said memory and a counter port for outputting the counter value and a bank selection signal by using predetermined higher bits among the counter output as the bank selection signal for selecting said data banks of said memory;

a counter for performing a predetermined operation according to a signal for selecting a mode when a mode for generating an address necessary for storing the video signal is referred to as an address generating mode and a mode for mapping an address necessary for accessing said memory is referred to as an address mapping mode;

multiplexers for outputting a counter value from said microprocessor to higher addresses of said memory when the mode selection signal is the address generating mode and outputting the is addresses output from said microprocessor as higher addresses of said memory when the mode selection signal is the address mapping mode; and a bank selecting unit for outputting higher bits among the signals output from said counter built in said microprocessor as a signal for selecting the data banks of said memory when the mode selection signal is the address mapping mode, wherein, in the address generating mode, said counter counts the number corresponding to that of pixels constituting a horizontal line of the video signal to output as lower addresses of said memory and is cleared by a clear signal having the same frequency as that of the horizontal synchronizing signal of the video signal, and, in the address mapping mode, said counter connects address lines output from said microprocessor to lower address lines of said memory wherein said counter built in said microprocessor is an 8 bit counter, and produces an interrupt whenever a horizontal synchronizing signal of the video signal is supplied and counts up to 256 horizontal lines, said address portion said microprocessor includes two ports P0 and P2 and outputs addresses A via said ports P0 and P2, said counter port produces and outputs addresses VA output from said 8 bit counter and signals VA for selecting data banks of said memory, and said counter counts 512 pixels and outputs the counted value as lower 9 bit addresses VDA of said memory in the address generating mode, and outputs lower 9 bit addresses A among the addresses A from said microprocessor as lower 9 bit addresses VDA of said memory in the address mapping mode.

2. An address generating and mapping device of a video capture system as claimed in claim 1, wherein said multiplexers output lower 4 bit addresses VA[12 . . . 9] output from said 8 bit counter built in said microprocessor as addresses VDA[12 . . . 9] of said memory in the address generating mode, and output 4 bit addresses A[12 . . . 9] from said microprocessor as the addresses VDA[12 . . . 9] of said memory in the address mapping mode.

3. An address generating and mapping device of a video capture system as claimed in claim 2, wherein said bank selecting unit outputs addresses VA[16 . . . 13] output from said counter built in said microprocessor as addresses VDA [16 . . . 13] of said memory in the address generating mode, and outputs data bank selection signals VA[16 . . . 14] from said microprocessor and an address A[13] as the addresses VDA[16 . . . 13] of said memory in the address mapping mode.

4. An address generating and mapping device of a video capture system as claimed in claim 1, wherein said memory includes 8 data banks having a 16 KB capacity.

5. An address generating and mapping device of a video capture system as claimed in claim 2, wherein said memory includes 8 data banks having a 16 KB capacity.

6. An address generating and mapping device of a video capture system as claimed in claim 3, wherein said memory includes 8 data banks having a 16 KB capacity.

7. An address generating and mapping device of a video capture system for capturing a video signal and storing said video signal in a memory comprised of predetermined data banks and reading data in said memory the device comprising:

a microprocessor having a counter counted by being synchronized with a horizontal synchronizing signal of the video signal an address port for outputting an address to be used when reading said memory, and a counter port for outputting the counter value and a bank selection signal by using predetermined higher bits among the counter output as the bank selection signal for selecting said data banks of said memory;

a counter for performing a predetermined operation according to a signal for selecting a mode, when a mode for generating an address necessary for storing the video signal is referred to as an address generating mode and a mode for mapping an address necessary for accessing said memory is referred to as an address mapping mode;

multiplexers for outputting a counter value from said microprocessor to higher addresses of said memory when the mode selection signal is the address generating mode and outputting the addresses output from said microprocessor as higher addresses of said memory when the mode selection signal is the address mapping mode; and a bank selecting unit for outputting higher bits among the signals output from said counter built in said microprocessor as a signal for selecting the data banks of said memory when the mode selection signal is the address mapping mode, wherein in the address generating mode said counter counts the number corresponding to that of pixels constituting a horizontal line of the video signal to output as lower addresses of said memory and is cleared by a clear signal having the same frequency as that of the horizontal synchronizing signal of the video signal, and, in the address mapping mode, said counter connects address lines output from said microprocessor to lower address lines of said memory wherein said counter built in said microprocessor is an N bit counter where N is a positive integer, and produces an interrupt whenever a horizontal synchronizing signal of the video signal is supplied and counts up to 2 N horizontal lines, said address port in said microprocessor includes two ports P0 and P2 and outputs addresses via said ports P0 and P2, said counter port produces and outputs addresses output from said N bit counter and signals for selecting data banks of said memory, and said counter counts $2^{N+1}$ pixels and outputs the counted value as lower bit addresses of said memory in the address generating mode, and outputs lower bit addresses among the addresses from said microprocessor as lower bit addresses of said memory in the address mapping mode.

8. An address generating and mapping device of a video capture system as claimed in claim 7, wherein said multiplexers output lower bit addresses output from said N bit counter built in said microprocessor as addresses of said memory in the address generating mode, and output lower bit addresses from said microprocessor as the addresses of said memory in the address mapping mode.

9. An address generating and mapping device of a video capture system as claimed in claim 8, wherein said bank selecting unit outputs addresses output from said counter built in said microprocessor as addresses of said memory in the address generating mode, and outputs data bank selection signals from said microprocessor and an address as the addresses of said memory in the address mapping mode.

\* \* \* \* \*